United States Patent [19]

Sullivan et al.

[11] 4,087,323

[45] May 2, 1978

[54] PIPE CONNECTOR

[75] Inventors: Thomas E. Sullivan, Evergreen Park; John A. Pardini, Brookfield, both of Ill.

[73] Assignee: The United States of America as represented by the United States Department of Energy, Washington, D.C.

[21] Appl. No.: 749,206

[22] Filed: Dec. 9, 1976

[51] Int. Cl.² .............................................. G21C 9/00
[52] U.S. Cl. ........................................ 176/38; 176/65; 176/87; 285/268; 176/40
[58] Field of Search ............ 285/9 R, 268, 302, 334.4, 285/187; 403/28, 166; 176/38, 87, 65, 40

[56] References Cited

U.S. PATENT DOCUMENTS

| | | | |
|---|---|---|---|
| 1,469,528 | 10/1923 | Owens | 285/268 |
| 2,242,604 | 5/1941 | Wells | 285/268 |
| 2,774,618 | 12/1956 | Alderson | 285/302 |
| 3,793,143 | 2/1974 | Muller | 176/87 |
| 3,807,772 | 4/1974 | Delisle et al. | 285/187 |
| 3,823,065 | 9/1974 | Jones | 176/87 |
| 3,977,940 | 8/1976 | Frisch et al. | 285/9 R |

FOREIGN PATENT DOCUMENTS 161,121  6/1933  Switzerland .......................... 285/9 R

OTHER PUBLICATIONS

Fast Reactor Technology: Plant Design, M.I.T. Press, (1966), Yevick et al. pp. 187–188.

Primary Examiner—Samuel W. Engle
Assistant Examiner—S. A. Cangialosi
Attorney, Agent, or Firm—Dean E. Carlson; Frank H. Jackson

[57] ABSTRACT

A safety test facility for testing sodium-cooled nuclear reactor components includes a reactor vessel and a heat exchanger submerged in sodium in the tank. The reactor vessel and heat exchanger are connected by an expansion/deflection pipe coupling comprising a pair of coaxially and slidably engaged tubular elements having radially enlarged opposed end portions of which at least a part is of spherical contour adapted to engage conical sockets in the ends of pipes leading out of the reactor vessel and in to the heat exchanger. A spring surrounding the pipe coupling urges the end portions apart and into engagement with the spherical sockets. Since the pipe coupling is submerged in liquid a limited amount of leakage of sodium from the pipe can be tolerated.

2 Claims, 2 Drawing Figures

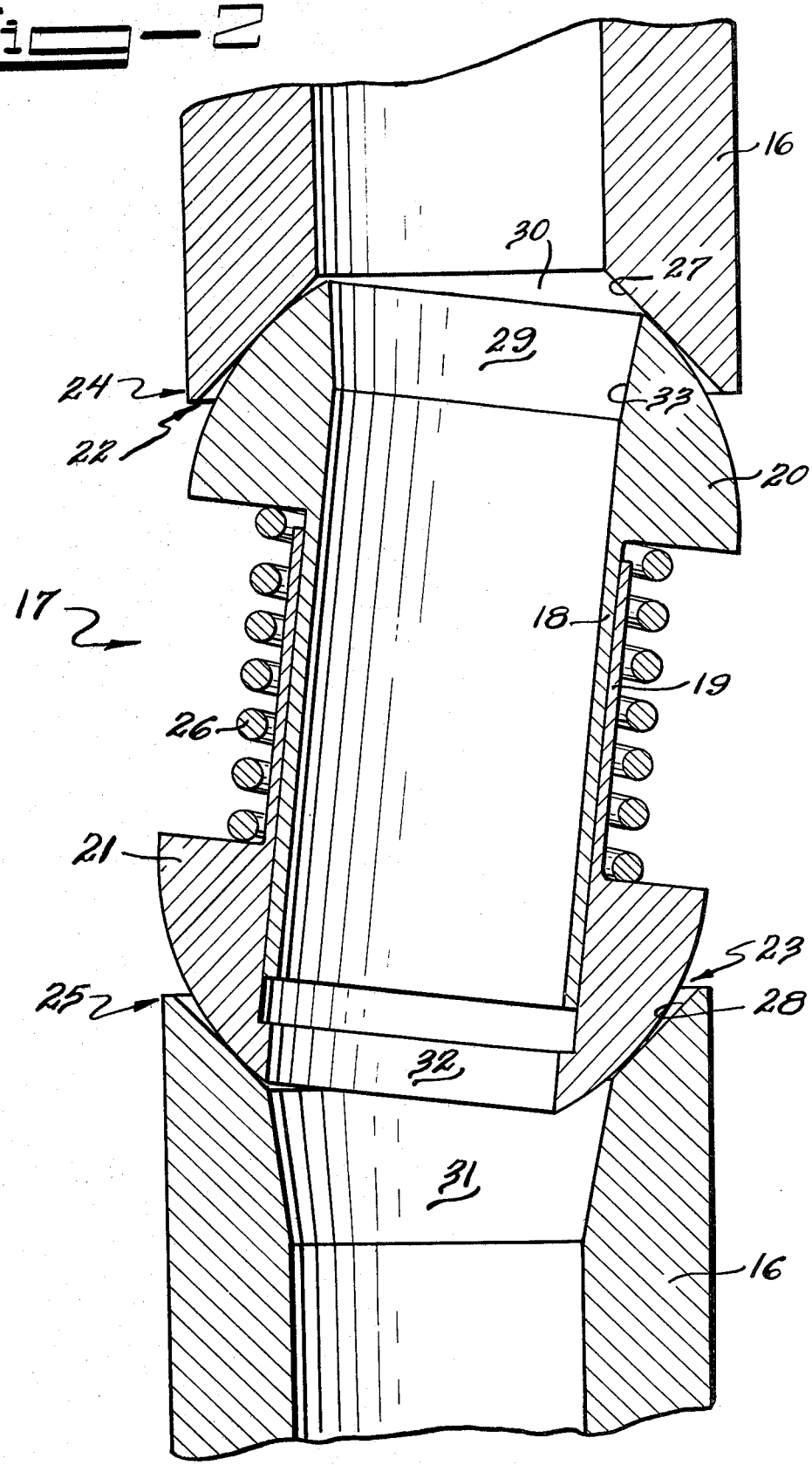

PIPE CONNECTOR

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to an all-metal pipe coupling that is short, flexible, and capable of expanding and contracting. In more detail the invention relates to such a pipe coupling for use in connecting pipes carrying a liquid metal wherein the pipes are submerged in the same liquid metal. The invention also relates to a fast reactor safety test reactor incorporating such a coupling.

A need exists for a pipe coupling that is short, flexible, capable of expanding and contracting and that will withstand the environment of a liquid-metal-cooled nuclear reactor. The last requirement precludes the use of plastic or rubber materials and essentially makes it necessary to form the connector solely of a metal such as stainless steel for metal-to-metal contact with the stainless steel pipes being connected.

A tank-type liquid-metal-cooled nuclear reactor includes a reactor, one or more pumps and one or more heat exchangers all submerged in sodium filling a large tank. A pipe connects the reactor vessel with a heat exchanger. If sufficient space is available, this pipe can contain a loop to allow for deflection and expansion or contraction of the components. Such allowance must be made for thermal effects as well as possible seismic shock. A problem arises if the design of the system does not provide sufficient room to incorporate a loop in this connecting pipe.

SUMMARY OF THE INVENTION

According to the present invention a pipe coupling incorporating only metal-to-metal contact that is laterally deflectable and transversely expandable and contractable includes a pair of coaxially and slidably engaged tubular elements having radially enlarged opposed ball portions of spherical contour, the ball portions being adapted to engage conical sockets in the ends of the pipes being connected. A spring surrounds the tubular elements and urges the end portions thereof apart and into engagement with the conical sockets. Preferably the conical sockets are formed by frustoconical surfaces on the interior of the pipe which flare outwardly at an angle of 45° to the axis of the pipe. Also preferably the internal diameter of the coupling is the same as that of the pipes being connected with the outlet end of the pipe and of the coupling being larger than the inlet end of the pipe and the coupling.

BRIEF DESCRIPTION OF THE FIGURES

FIG. 2 is a cross section of the pipe coupling.

DETAILED DESCRIPTION OF THE INVENTION

Figure 1:
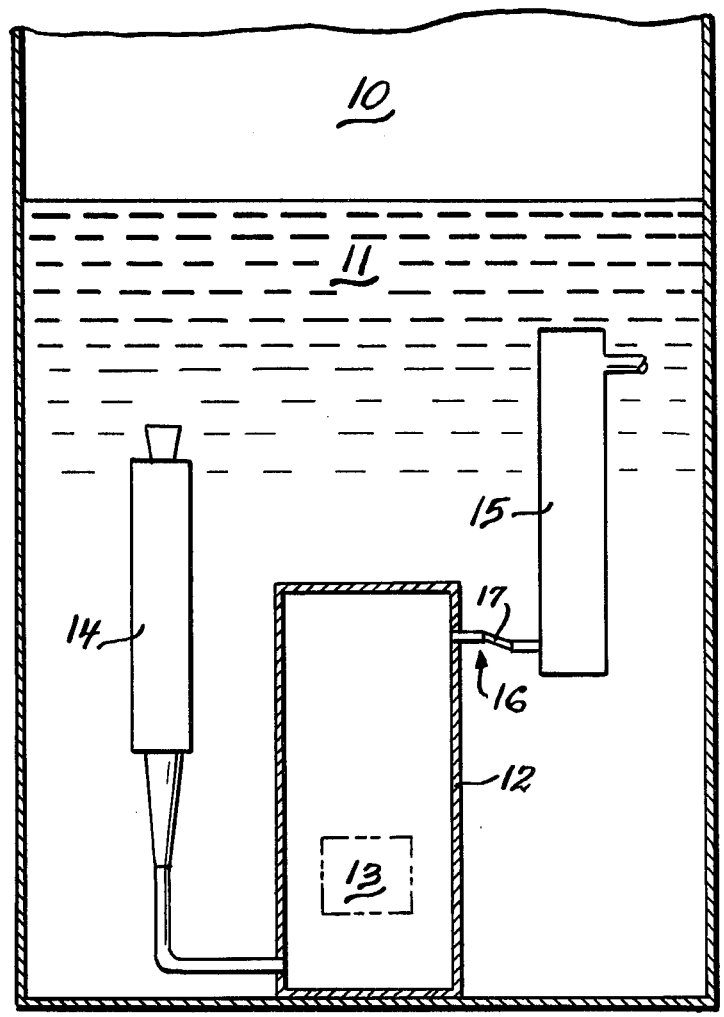
FIG. 1 is a sketch of a tank-type liquid-metal-cooled reactor incorporating the pipe coupling of the present invention.

As shown a fast reactor safety test facility includes a tank 10 containing a body of sodium 11. Submerged in the sodium is a reactor vessel 12 containing a nuclear reactor core 13, one or more pumps 14 designed to direct sodium in the tank through the reactor, one or more heat exchangers 15 through which heated sodium from the reactor flows prior to its return to the bulk sodium in the tank and a pipe 16 connecting the reactor vessel 12 with heat exchangers 15. The amount of space between reactor vessel 12 and heat exchanger 15 is limited wherefore a pipe coupling 17 is employed in pipe 16 to accept relative motion of one of the components with respect to the other without damage to the line.

Referring now to FIG. 2 pipe coupling 17 includes a pair of coaxially and slidably engaged tubular elements 18 and 19 having radially enlarged ball portions 20 and 21 of spherical contour at opposite ends thereof. Ball portions 20 and 21 are adapted to engage conical sockets 22 and 23 in the outlet end 24 and the inlet end 25 of the pipe 16 connecting reactor vessel 12 and a heat exchanger 15. A spring 26 surrounds the narrower part of the coupling 17 and acts on ball portions 20 and 21 thereof to urge them into engagement with conical sockets 22 and 23 in the inlet ends of pipe 16.

Conical sockets 22 and 23 are formed by frustoconical surfaces 27 and 28 on the interior of ends of the pipe which flare outwardly at an angle of 45° with respect to the axis of pipe 16 to ensure that contact between the ball portions 20 and 21 and conical sockets 22 and 23 will be a tangential contact near the center of the frustoconical surfaces 27 and 28.

The internal diameter of pipe 16 and of pipe coupling 17 is the same. To avoid an obstruction to the flow of sodium through the coupling when one part of pipe 16 is deflected with respect to the other one — the condition shown in the drawing — the inlet throat 29 of the pipe coupling 17 is enlarged with respect to the outlet throat 30 of pipe 16 and the inlet throat 31 of pipe 16 is enlarged with respect to the outlet throat 32 of pipe coupling 17. This is accomplished by providing outwardly flared frusto-conical surfaces 33 and 34 to form throats 29 and 31, surface 34 flaring at an angle less than 45°.

It will be at once apparent that the above-described pipe coupling accepts deflection motions — since the connections between coupling and pipe constitute ball-and-socket joints — and also will expand and contract as required. While the metal-to-metal contacts employed in the coupling are not perfectly leak tight, this can be tolerated since the connecting pipe between the reactor vessel and the heat exchanger carries heated sodium while being submerged in sodium. Thus, any leakage would merely result in a slight loss in efficiency.

The embodiments of the invention in which an exclusive property or privilege is claimed are defined as follows:

1. An expansion/deflection coupling for use with pipes carrying a liquid metal where a limited amount of leakage can be tolerated comprising a pair of coaxially and slidably engaged tubular elements having substantially the same diameter throughout the length thereof, said tubular elements having radially enlarged opposed ball portions of spherical contour, said ball portions being adapted to engage conical sockets in the ends of the pipes being connected, the inner diameter of the pipes being connected being substantially equal to the internal diameter of the coupling, said conical sockets being formed by frustoconical interior surfaces at the end of the pipes which flare outward at an angle of 45° to the axis of the pipe, a flared inlet throat in the coupling being larger than an outlet throat in the pipe, a flared inlet throat in the pipe being larger than an outlet throat in the coupler, and spring means for urging said spherical portions apart and into engagement with said conical sockets.

2. In a liquid-metal-cooled safety test facility including a tank containing said liquid metal, a reactor vessel containing a nuclear reactor core, at least one pump and at least one exchanger submerged in said liquid metal and being connected by lines carrying said liquid-metal coolant, the improvement comprising an expansion/deflection coupling in a line having conical sockets in the ends thereof between components of the facility comprising a pair of coaxially and slidably engaged tubular elements having substantially the same diameter throughout the length thereof and radially enlarged ball portions of spherical contour, said ball portions being adapted to engage said conical sockets in the ends of the lines being connected, the inner diameter of the lines being connected is substantially equal to the internal diameter of the coupling, said conical sockets being formed by frustoconical interior surfaces at the end of the lines which flare outward at an angle of 45° to the axis of the lines, a flared inlet throat in the coupling being larger than an outlet throat in the line, and a flared inlet throat in the line being larger than an outlet throat in the coupler, and spring means for urging said spherical portions apart and into engagement with said conical sockets.

* * * * *